United States Patent
Inan et al.

(10) Patent No.: US 12,006,743 B2
(45) Date of Patent: Jun. 11, 2024

(54) DOOR LOCK, IN PARTICULAR MOTOR VEHICLE DOOR LOCK

(71) Applicant: Kiekert AG, Heiligenhaus (DE)

(72) Inventors: Ömer Inan, Dorsten (DE); Holger Schiffer, Meerbusch (DE); Michael Scholz, Essen (DE); Peter Szegeny, Engelskirchen (DE); Thomas Schönenberg, Burscheid (DE)

(73) Assignee: Kiekert AG, Heiligenhaus (DE)

( * ) Notice: Subject to any disclaimer, the term of this patent is extended or adjusted under 35 U.S.C. 154(b) by 200 days.

(21) Appl. No.: 17/438,974

(22) PCT Filed: Mar. 6, 2020

(86) PCT No.: PCT/DE2020/100152
§ 371 (c)(1),
(2) Date: Sep. 14, 2021

(87) PCT Pub. No.: WO2020/187358
PCT Pub. Date: Sep. 24, 2020

(65) Prior Publication Data
US 2022/0127883 A1    Apr. 28, 2022

(30) Foreign Application Priority Data
Mar. 21, 2019 (DE) .................. 10 2019 107 229.8

(51) Int. Cl.
*E05B 85/26* (2014.01)
*E05B 77/02* (2014.01)
(Continued)

(52) U.S. Cl.
CPC .............. *E05B 85/26* (2013.01); *E05B 77/02* (2013.01); *E05B 79/08* (2013.01); *E05B 85/243* (2013.01); *F16C 11/04* (2013.01)

(58) Field of Classification Search
CPC ........ E05B 85/20; E05B 85/24; E05B 85/243; E05B 85/26; E05B 79/00; E05B 79/02;
(Continued)

(56) References Cited

U.S. PATENT DOCUMENTS 5,092,639 A * 3/1992 Di Giusto ............... E05B 85/26
292/216
9,512,651 B2 * 12/2016 Taurasi ................... E05B 81/90
(Continued)

FOREIGN PATENT DOCUMENTS

| DE | 102009029023 A1 | 3/2011 |
| DE | 102016215336 A1 | 3/2017 |

(Continued)

OTHER PUBLICATIONS

International Search Report issued Jun. 2, 2020, for International Patent Application No. PCT/DE2020/100152.

*Primary Examiner* — Alyson M Merlino
(74) *Attorney, Agent, or Firm* — Renner, Otto, Boisselle & Sklar, LLP (57) ABSTRACT

A door lock, in particular a motor vehicle door lock, which is equipped with a locking mechanism that substantially consists of a rotary latch and at least one pawl. Each of the two locking mechanism parts is rotatably supported on a base about a respective axis. For this purpose, a bearing surface of each locking mechanism part slides along a fixed support body. According to the invention, the support body is provided with an open bearing trough for receiving the bearing surface.

18 Claims, 5 Drawing Sheets

(51) Int. Cl.
*E05B 79/08* (2014.01)
*E05B 85/24* (2014.01)
*F16C 11/04* (2006.01)

(58) Field of Classification Search
CPC ........ E05B 79/08; E05B 15/004; E05B 77/36; Y10S 292/23
See application file for complete search history.

(56) References Cited

U.S. PATENT DOCUMENTS

| | | | | |
|---|---|---|---|---|
| 9,765,554 | B2* | 9/2017 | Cumbo | E05B 85/26 |
| 10,113,342 | B2* | 10/2018 | Spurr | E05B 85/26 |
| 10,132,107 | B2* | 11/2018 | Tomaszewski | E05B 85/26 |
| 11,371,268 | B2* | 6/2022 | Graute | E05B 79/08 |
| 11,525,287 | B2* | 12/2022 | Ishiguro | E05B 85/26 |
| 11,608,664 | B2* | 3/2023 | Nishijima | E05B 85/26 |
| 11,674,341 | B2* | 6/2023 | Ishiguro | E05B 85/26 292/194 |
| 2007/0278802 | A1* | 12/2007 | Hanisch | E05B 79/08 292/216 |
| 2011/0260475 | A1 | 10/2011 | Spurr | |
| 2016/0215536 | A1* | 7/2016 | Cumbo | E05B 85/243 |
| 2017/0051540 | A1* | 2/2017 | Okeke | E05B 85/26 |
| 2017/0067272 | A1* | 3/2017 | Margheritti | E05B 81/16 |
| 2019/0211588 | A1* | 7/2019 | Graute | E05B 79/08 |
| 2021/0032910 | A1* | 2/2021 | Fuchs | E05B 79/08 |
| 2021/0156175 | A1* | 5/2021 | Ishiguro | E05B 81/44 |

FOREIGN PATENT DOCUMENTS

| | | |
|---|---|---|
| DE | 102016201536 A1 | 8/2017 |
| EP | 0406777 A1 | 1/1991 |
| EP | 0496039 A1 | 7/1992 |
| EP | 2113048 A1 | 11/2009 |
| WO | WO-2023006143 A1 * | 2/2023 |

* cited by examiner

DOOR LOCK, IN PARTICULAR MOTOR VEHICLE DOOR LOCK

This application is a national phase of International Application No. PCT/DE2020/100152 filed Mar. 6, 2020, which claims priority to German Patent Application No. 10 2019 107 229.8 filed Mar. 21, 2019.

FIELD OF DISCLOSURE

The invention relates to a door lock, in particular a motor vehicle door lock, which is equipped with a locking mechanism that substantially consists of a rotary latch and at least one pawl, wherein each of the two locking mechanism parts is rotatably supported on a base about a respective axis, and, for this purpose, the at least one locking mechanism part slides with a bearing surface along a fixed support body.

BACKGROUND OF DISCLOSURE

The locking mechanism, which is a safety-relevant component, is of particular importance for door locks and in particular motor vehicle door locks. To protect the door, especially in the event of a frontal impact, or more generally, a crash, forces introduced into the bodywork must be transferred to the car body. In fact, the locking mechanism ultimately prevents the associated motor vehicle door equipped with the door lock from opening during such an event. The motor vehicle door can actually contribute to the targeted deformation of the car body. This presupposes that the locking mechanism is able to absorb the so-called tearing forces that act on the locking mechanism in this case.

The tearing forces are generally transmitted from the locking mechanism part via its bearing surfaces to the fixed support body and from there to the base. The base is usually a solid lock case, which is connected to a motor vehicle door, in order to transmit the forces. On the car body side, the force flow takes place via a locking bolt that is caught by means of the locking mechanism, which, in turn, is connected for example to a B pillar of the motor vehicle body. In addition to this force applied to the bearing of the relevant locking mechanism part or its bearing surface in connection with the fixed support body, a particularly low-friction actuation of the respective locking mechanism part is of special importance.

This can be attributed to the fact that nowadays such door locks, in particular motor vehicle door locks, are often operated and, in particular opened, by an electric motor. In order to set the opening forces as low as possible at this point and to be able to work with small motors, various approaches to optimize the friction have already been pursued. DE 10 2016 2015 336 A1, for example, suggests equipping the locking mechanism part, in this special case the pawl, with a bearing cage. The bearing cage, in turn, accommodates a ball or a cylinder, for example, in order to ensure an overall rolling friction between the pawl and the rotary latch and to thereby positively influence the friction conditions.

In the generic state of the art according to DE 10 2009 029 023 A1, the pawl is configured at this point as a rotatably mounted carrier pawl, which receives a locking pawl connected to said carrier pawl via a joint. In this respect, the state of the art provides approaches for optimizing the friction conditions between the pawl and the rotary latch. The total actuation torque required to actuate, for example, the pawl as a locking mechanism part depends not only on the friction between the pawl and the rotary latch in the exemplary case but is also particularly influenced by the bearing friction of the pawl relative to the base. At this time, there are not yet any promising approaches to reducing the respective bearing friction.

In fact, typically, and in accordance with the previously described state of the art, according to DE 10 2016 215 336 A or also according to DE 10 2009 029 023 A1, the approach that is generally used in this regard is to provide the pawl or generally the locking mechanism part with an opening and to fit the mechanism with said opening onto a fixed bearing bolt. The opening in the locking mechanism part thus defines the bearing surface of the locking mechanism part, whereas the bearing bolt acts as a fixed support body during a rotary movement. The bearing bolt or fixed support body, respectively, is, in turn, connected to the base, generally a lock case.

In order to reduce the bearing friction of the locking mechanism part relative to the bearing bolt or the fixed support body, the bearing pin as a whole or its radius can be reduced. However, a smaller dimensioning of the bearing pin in this direction conflicts with the strength requirements described above because when reducing the diameter of the bearing pin, a reduction of the resistance torque against the tearing forces acting on the lock must be expected at the same time, which is unacceptable due to the safety requirements described above. This is where the invention seeks to provide an overall remedy.

SUMMARY OF DISCLOSURE

The invention is based on the technical problem of further developing a door lock of this type, in particular a motor vehicle door lock, in such a way that the bearing friction of the locking mechanism part is reduced while at the same time the strength remains unchanged or is even increased.

To solve this technical problem, a generic door lock, in particular a motor vehicle door lock within the scope of the invention, is characterized in that the support body is equipped with an open bearing trough for receiving the bearing surface. In this connection the further and advantageous approach is to additionally equip the locking mechanism part with a bearing pin having a bearing surface. In most cases, the bearing surface is provided at the front of the bearing pin.

In contrast to the state of the art, the invention consequently does not resort to a bearing bolt as a fixed support body which is completely enclosed by an opening in the locking mechanism part. Rather, the respective locking mechanism part is equipped with a bearing pin which, on the front side, comprises the bearing surface that interacts with the support body. Furthermore, since the support body has an open bearing trough for receiving the bearing surface and consequently does not completely surround either the bearing surface or the bearing pin, the support body as a whole can, compared to the state of the art, be equipped with a much larger cross-section than before. Since the support body is equipped with the open bearing trough, there is a rotating interaction between the bearing trough and the bearing surface on the bearing pin over a certain pivot angle.

This means that, according to the invention, the support body can be equipped with a larger cross-section than the bearing bolt in conventional door locks, which results in a significantly increased modulus of resistance. In fact, the support body typically has a resistance radius associated with the modulus of resistance. The bearing surface itself is usually arc-shaped and has a bearing radius. According to the invention, the design is such that the resistance radius is larger than the bearing radius. In fact, the resistance radius can be at least 1.2 times, usually even 1.5 times or even more than the bearing radius.

This way, the previously described and conflicting requirements can be easily implemented and realized within the scope of the invention. On the one hand, the bearing radius of the locking mechanism part can be relatively small, or at least smaller than in the state of the art. As a result, optimized friction conditions are observed between the respective locking mechanism part and the support body. Despite this small bearing radius, on the other hand, comparable or even higher strengths or moduli of resistance are achieved. This can be explained by the fact that the bearing pin interacting with the support body to provide bearing support, with the support body having an open bearing trough for receiving the bearing surface on the bearing pin, has a resistance radius that is generally significantly larger than the bearing radius. As a result, the support body has a cross-section which provides a high modulus of resistance for the tearing forces acting on the locking mechanism part. This is where the main advantages are to be seen.

According to an advantageous embodiment, the support body may have at least one stop arranged on the side of the bearing trough. In most cases, two stops are provided on both sides of the open bearing trough. The stop generally interacts with a counter stop of the locking mechanism part.

This design ensures overall that the stop or the two stops on the support body at the side of the bearing trough limit a pivoting movement of the locking mechanism part relative to the support body. In fact, at the two limits of this pivoting movement, there is a respective interaction of the stop on the support body on the one hand and with the counter stop on the locking mechanism part on the other. In order to operate as quietly as possible at this point, the counter stop of the locking mechanism part is usually made wholly or partly of plastic and may, for this purpose, be defined at least partially in or on a casing of the relevant locking mechanism part. The pivoting angle already mentioned can thus be limited to values of up to 90°, preferably up to 60° and particularly preferably up to 50°.

The base is generally designed as a preferably metallic lock case. Such a lock case is regularly characterized by a metallic base plate and two lateral, likewise metallic side troughs, which together form a profile that is U-shaped in section. In principle, however, L-shaped lock cases or flat lock cases are possible as well and comprised by the invention. The support body is connected to the lock case. Most often, the support body is a resistance anchor connected to the lock case. As a result, the support body has a certain resistance radius, which was mentioned earlier. This resistance radius is measured on the basis of a distance from a center of gravity of the support body to its periphery.

In any case, the overall resistance radius is larger than the bearing radius, which takes into account the arched shape of the bearing surface and is defined by said arc. In addition to the previous explanations, the resistance radius can even be twice the bearing radius or even more and is, in any case, larger or significantly larger than the bearing radius.

As already explained, the locking mechanism part is usually encased or equipped with a casing. According to the invention, this casing has a variety of functions. First of all, it is generally known that the casing ensures a noise-optimized movement of the locking mechanism part within the lock case. According to the invention, the casing also functions in such a way that it helps define the previously mentioned counter stop of the locking mechanism part, which interacts with the associated stop of the support body.

In this case, the design of the counter stop in or on the casing means that there is no hard stop between the locking mechanism part and the support body, which again favors the noise-optimized design.

Furthermore, the invention additionally provides at least one guide surface. The guide surface may be provided in or on the casing of the locking mechanism part and/or a plastic housing. The guide surface is present in addition to the bearing surface and supports the pivoting operation of the locking mechanism part opposite the support body. The guide surface also ensures that the locking mechanism part is held in contact with the support body.

For this purpose, the guide surface generally interacts with a mating guide surface. The mating guide surface can be realized on the locking mechanism part and/or its casing and/or the plastic housing already mentioned. In most cases, the guide surface is provided in or on the plastic housing and interacts with a mating guide surface in or on the casing of the respective locking mechanism part, or vice versa.

The plastic housing is typically a lock housing, with the help of which the locking mechanism mounted in the lock case is fully covered and sealed. That means that, according to the invention, this plastic housing also performs a further function in addition to the sealing, namely that it provides one or more mating guide surfaces for the guide surface on the casing of the relevant locking mechanism part. As a result of this, the movement of the locking mechanism part relative to the support body is guided properly. Consequently, due to the additional recourse to material pairings such as metal-plastic or plastic-plastic, the complementary guide is designed to be particularly low-friction and does not generate any actuation noise. This is where the main advantages are to be seen.

BRIEF DESCRIPTION OF DRAWINGS

In the following, the invention is described by means of only one drawing illustrating an exemplary embodiment.

DETAILED DESCRIPTION

Figure 1:
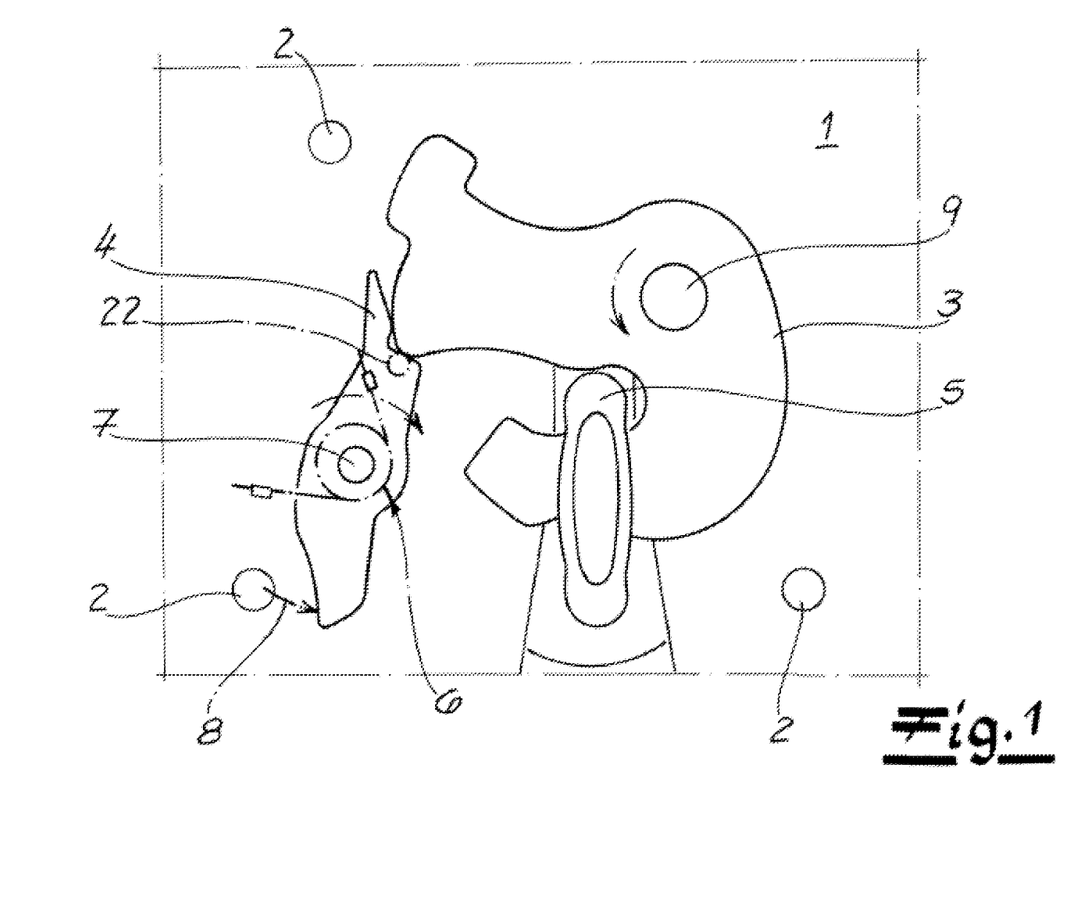
FIG. 1 is the door lock according to the invention in its general shape

FIG. 1 is an illustration of a door lock, which is a motor vehicle door lock. The motor vehicle door lock is advantageously connected to a motor vehicle door, which is not shown. A base 1, which, in the exemplary embodiment is a metallic lock case 1, is used for this purpose. The lock case 1 is connected to the motor vehicle door lock, which is not shown. Fastening screws are used to engage in openings 2 of the lock case.

In the lock case 1, a locking mechanism 3, 4 is mounted, which, according to the exemplary embodiment, is composed of a rotary latch 3 and a pawl 4. In principle, more than one pawl 4, i.e., a so-called multiple pawl locking mechanism, could also be implemented, but this is not shown. The pawl 3, 4 of the door lock or motor vehicle door lock interacts with a locking bolt 5, which is connected to a motor vehicle body, which is not shown.

FIG. 1 shows the closed state of the locking mechanism 3, 4 according to the state of the art. In this closed state, the locking bolt 5 is caught by means of the rotary latch 3, as is generally known. The rotary latch 3 is, in turn, held in the closed position, or the main rest position shown here, by means of the pawl 4. An additional pawl spring 6 ensures in this case that the pawl 4 is provided with a closing torque indicated in FIG. 1 with respect to its axis 7, which is indicated in FIG. 1. The rotary latch 3 also has a torque that is likewise indicated in FIG. 1, which in this case is designed as an opening torque or opening moment.

The closing torque on the pawl 4 works on the pawl 4 in the clockwise direction with respect to its axis 7. The opening torque of the rotary latch 3 works on its axis 9 in the counterclockwise direction. In addition, FIG. 1 also shows an electric drive or opening drive 8, which applies an opening torque or opening moment to the pawl 4 in a counterclockwise direction with respect to its axis 7. As soon as the pawl 4 is lifted from its engagement with the rotary latch 3 by means of the opening drive 8, the rotary latch 3 can swing open due to its opening moment (caused in particular by the rubber sealing forces of the door) and releases the locking bolt 5.

FIGS. 2 to 5 now show different variants of the mounting of a locking mechanism part 3, 4 in the specific example of the pawl 4. In fact, the respective locking mechanism 3, 4 or the pawl 4 is mounted in the region of its axis 7 according to the exemplary embodiment in the manner shown in detail in FIGS. 2 to 5 on the basis of different exemplary embodiments. For this purpose, the respective locking mechanism part or the pawl 4 has a bearing surface 10. To realize the bearing of the pawl 4 in the example with respect to the base or in the lock case 1 about the axis 7, the respective bearing surface 10 slides along a fixed support body 11, which basically takes over the function of a bearing bolt previously realized in the state of the art because the support body 11 is connected to the base 1. It is even possible that the support body 11 is part of the base 1, namely as an upwardly bent lug of the lock case 1, as shown in the variant in FIG. 5, which will be discussed in more detail below.

According to the invention, the fixed support body 11 is equipped with an open bearing trough 12 for receiving the bearing surface 10. According to the exemplary embodiment, the bearing surface 10 of the locking mechanism part or the pawl 4 is provided on a bearing pin 13. In fact, the bearing pin 13 is part of the pawl 4 in the example. In addition, the bearing pin 13 is provided with a previously mentioned bearing surface 10 on the front side, which in conjunction with the open bearing trough 12, provides the bearing for the pawl 4 about its axis 7 in the lock case 1.

Figure 5:
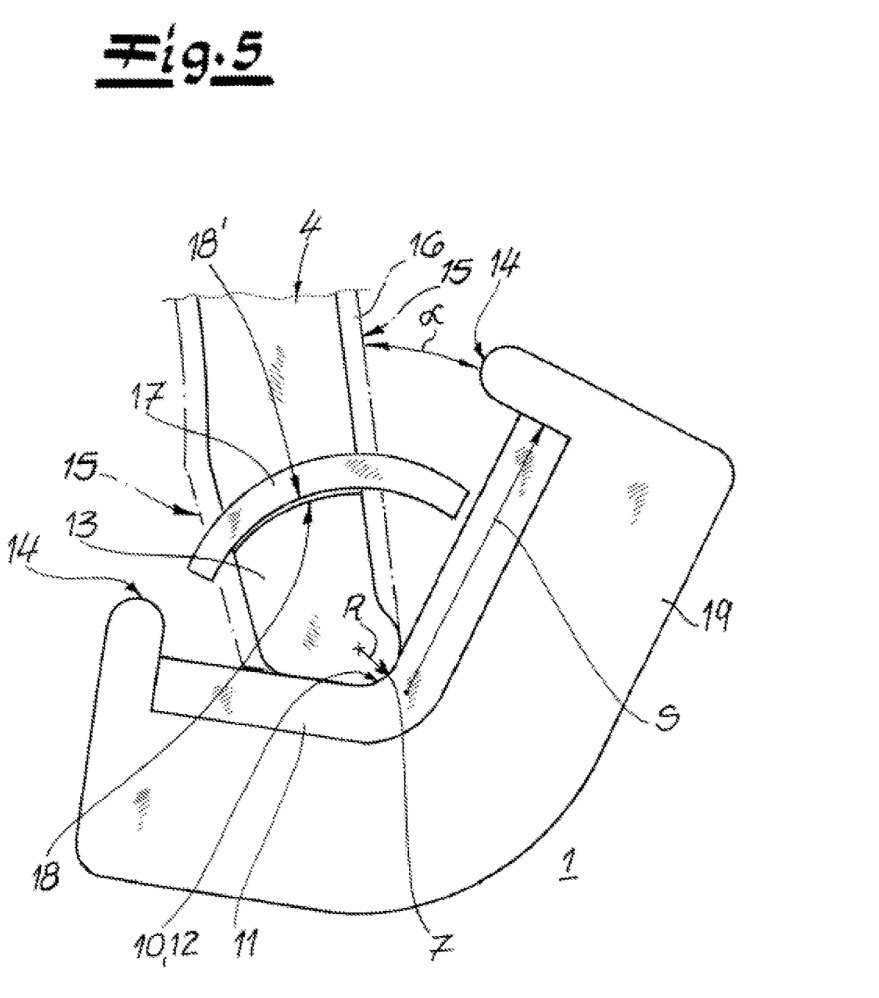
FIG. 5 is a further fourth exemplary embodiment of the invention.

The support body 11 has a stop 14 arranged at the side of the bearing trough 12. In fact, according to the exemplary embodiments, two stops 14 are provided at the side of the bearing trough 12. The two stops 14 accommodate the bearing trough 12 approximately in the center. FIG. 5 shows that the stops 14 may not only be realized on the support body 11, but also on a plastic housing 19.

In this context, the design is further made in such a way that the relevant stop 14 interacts with a counter stop 15. In the example, the counter stop 15 is provided on the locking mechanism part 3, 4 or the pawl 4. Furthermore, in the exemplary embodiments in FIGS. 2 to 5, the design is such that the counter stop 15 is formed on or in a casing 16 of the relevant locking mechanism part 4 or the pawl 4. The casing 16 is a plastic casing of the pawl 4, which is used for noise optimization purposes. In the exemplary embodiment and according to the invention, the casing 16 now assumes additional functions in that, with the help of the casing 16, the respective counter stops 15 are made available for the stops 14 of the support body 11.

Either way, the rotatable bearing of the pawl 4 with its bearing surface 10 at the front of the bearing pin 13 within the open bearing trough 12 of the support body 11 causes the axis or axis of rotation 7 to be defined. Further, the interaction between the stops 14 on the support body 11 or on the plastic housing 19 and the counter stops 15 on the relevant locking mechanism part or the pawl 4 causes pivoting angles α of the relevant locking mechanism part 4 or the pawl 4 to be limited with respect to the support body 11, in the exemplary embodiment to pivoting angles α which can amount to up to 90°. According to the exemplary embodiment, pivoting angles α of up to 50° are observed.

As explained earlier, the base 1 is a metallic lock box 1. The support body 11 is made of metal as well and is connected to the lock case 1. Within the context of the variant according to FIG. 5, the support body 11 and the lock case 1 are even formed in one piece because the support body 11 is designed as a bent lug of the lock case 1. In this way, the support body 11 defines an overall resistance radius S, which is determined by a radius starting from the center of gravity of the support body 11 to its periphery. The respective resistance radius S defines a modulus of resistance provided by the support body 11 with respect to the tearing forces F already mentioned, which are indicated by way of example in FIG. 2. Such tearing forces F occur, for example, in the event of a crash.

In addition to the resistance radius S, a bearing radius R is relevant to the invention. This bearing radius R results from the fact that the bearing surface 10 on the front side of the bearing pin 13, on the pawl 4 has an overall arc-shaped design so that the respective bearing radius R arises as a result. The overall design is such that the aforementioned resistance radius S of the support body 11 is configured to be larger than the bearing radius R. In fact, most often the configuration is such so that the following relation applies:

$S \geq 1.2\ R.$

Preferably, even size ratios of $S \geq 1.5\ R$ and especially $S \geq 2\ R$ are observed.

The previously mentioned casing 16 of the pawl 4 not only provides the counter stops 15 for the stops 14 on the support body 11 or the plastic housing 19, but the casing 16 also comprises at least one guide surface 18. This guide surface 18 slides along a mating guide surface 18', which is provided by the plastic housing already mentioned. The plastic housing 19 is used to close the lock case 1. The plastic housing in question is usually a so-called "lock cover." In any case, the interaction between the guide surface 18 on the pawl 4 on the one hand and the mating guide surface 18' on the plastic housing 19 on the other hand ensures that the locking mechanism part 4 is properly guided during its rotary movement about the axis 7. In addition, the respective locking mechanism part or pawl 4 is shown to be in contact with the support body 11. That means that the interaction between the guide surface 18 and the mating guide surface 18' ensures that the bearing pin 13 remains in contact with its bearing surface 10 within the open bearing trough 12 and is not separated therefrom.

Figure 2:
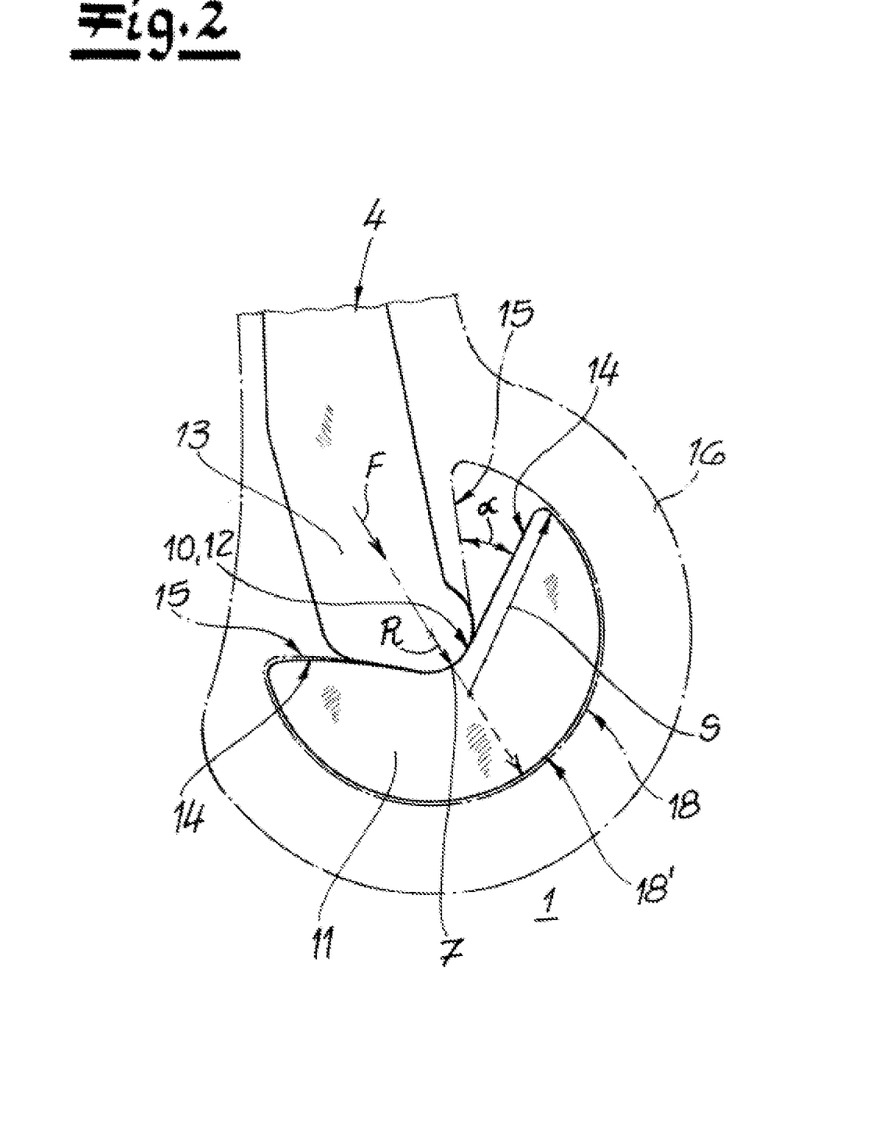
FIG. 2 is a first embodiment of a bearing of the locking mechanism part or the pawl, respectively, in the exemplary case

In the exemplary embodiment shown in FIG. 2, the guide surface 18 is realized in or on the casing 16 of the pawl 4. Here, the design is such that the guide surface 18 in the casing 16 engages around the outer circumference of the support body 11. The support body 11 has a corresponding mating guide surface 18' so that the bearing pin 13 on the pawl 4 is held with its front-side bearing surface 10 in contact with the open bearing trough 12 of the support body 11.

According to the exemplary embodiment, the guide surface 18 may also alternatively or additionally be provided by an indicated plastic housing 19, which serves to close the lock case 1. The respective plastic housing is usually a so-called lock cover. In any case, the at least one guide surface 18 ensures that the locking mechanism 4 is properly guided during its rotary movement about the axis 7 and, in particular, that the mutual contact of the bearing surface 10 within the open bearing trough 12 is not broken.

In the exemplary embodiment according to FIG. 2, the guide surface 18 is realized in or on the casing 16 of the pawl 4. Here, the design is such that the guide surface 18 in the casing 16 supports the support body 11 on the outer circumference so that the bearing pin 13 on the pawl 4 is held with its front bearing surface 10 in contact with the open bearing trough 12 of the support body 11.

In all exemplary embodiments, the design as a whole is such that the bearing pin 13 provided on the pawl 4 does not, at least the region of its front bearing surface 10, comprise the casing 16 so that, in this region, a perfect transmission of force from the metallic bearing pin 13 to the likewise metallic support body 11 can take place so that the tearing forces F acting thereon in the event of a crash do not lead to any plastic deformations.

Figure 3:
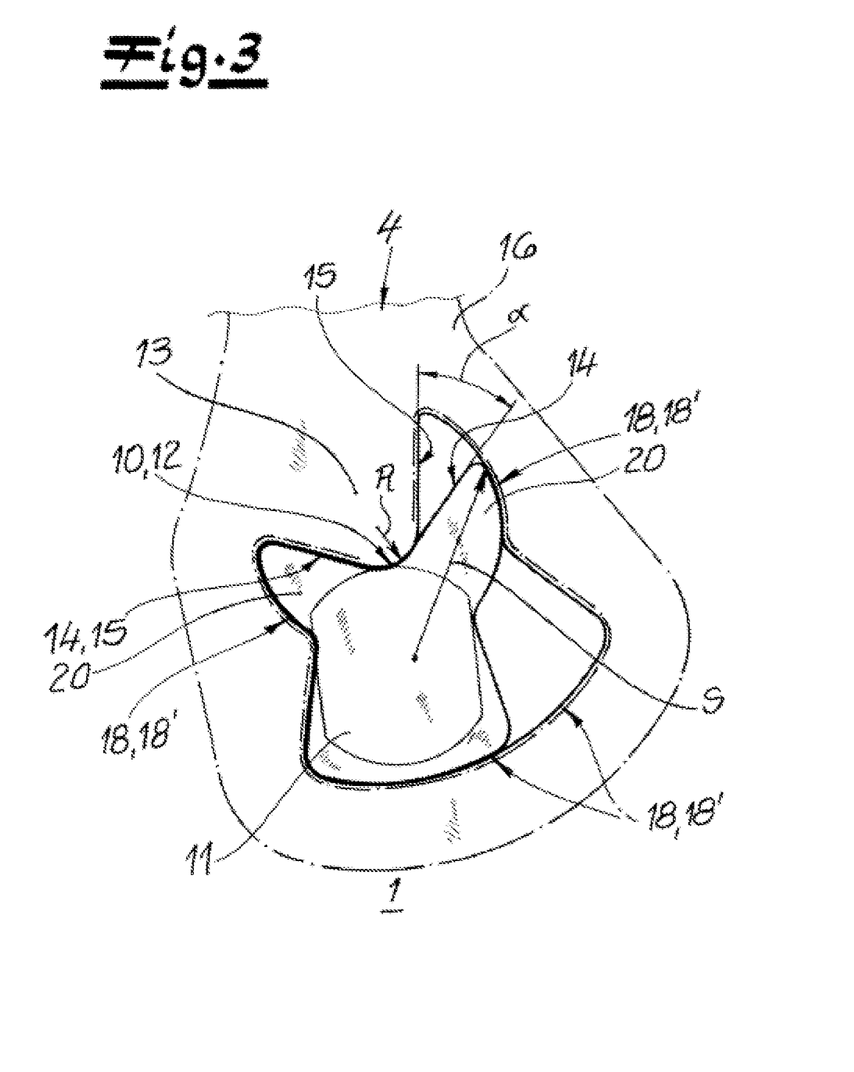
FIG. 3 is a further modified exemplary embodiment of the bearing.

In the variant according to FIG. 3, a guide surface 18 is also provided on the plastic casing 16 of the pawl 4, which again surrounds the outer circumference of the support body 11. This, in turn, ensures that the bearing pin 13 on the pawl 4 with its bearing surface 10 is held in contact with the open bearing trough 12 of the support body 11. In addition, further guide surfaces 18 or counter guide surfaces 18' can be seen here, which are again formed in the casing 16 or on the support body 11 and interact with the lateral guide flanks 20 of the support body 20 bearing the stops 14. These flanks 20 do not only comprise the stops 14 that interact with counter stops 15 in or on the casing or the plastic casing 16. Rather, the flanks 20 are also provided with an arc shape adjoining the stops 14 on the underside. This way, counter guide surfaces 18' are defined in this region which interact with the guide surfaces 18 in or on the casing 16.

Figure 4:
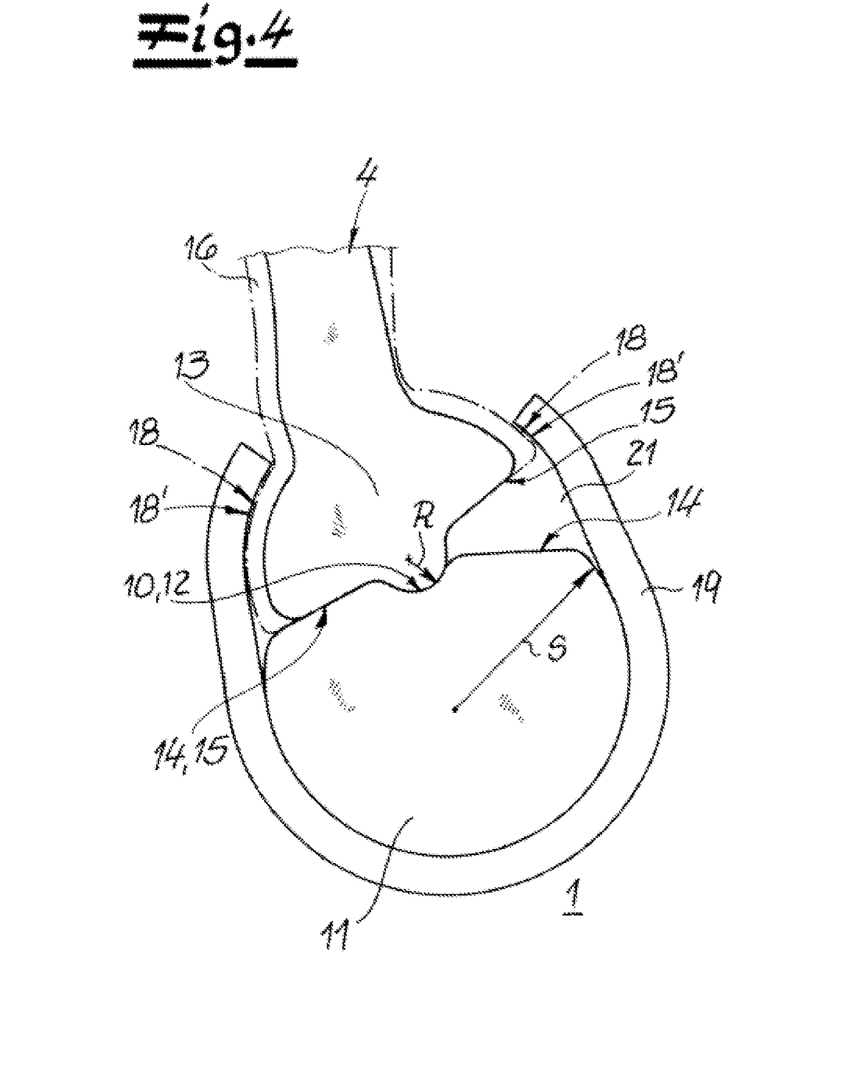
FIG. 4 is a further third embodiment variant.

The variant according to FIG. 4 is provided with a counter guide surface 18', which is realized in the plastic housing 19 or the plastic hood 19. The mating guide surface 18' in or on the plastic hood 19 interacts with an associated guide surface 18 of the casing 16. For this purpose, the plastic hood 19 is equipped with a chamber 21, which is designed to be open. In addition, the plastic hood 19 surrounds the support body 11 on the outer circumference and also the bearing pin 13 of the pawl 4, which, in this case, is of meniscus-like design. The bearing surface 10 held in contact with the bearing trough 12 of the support body 11. This is because, in this case, the mating guide surfaces 18' are realized on the one hand on the plastic housing 19, and on the other hand the guide surfaces 18 are realized on the outer circumference of the casing 16 of the pawl 4. Finally, in the third exemplary embodiment according to FIG. 5, the approach is that the guide surface 18 in or on the casing 16 of the pawl 4 interacts with the already mentioned arc segment 17 on the support body 11 or on the plastic housing 19. Since the arc segment 17 of the support body 11 or of the plastic housing 19 engages over the guide surface 18 of the respective pawl 4 and is equipped with the corresponding mating guide surface 18', this interaction again ensures that the pawl 4 is held with its bearing pin 13 and the front bearing surface 10 in contact with the open bearing trough 12. For this purpose, the guide surface 18 is unspecifically realized on the bearing pin 13 of the pawl.

What all exemplary embodiments have in common is the possibility that at least one additional bearing body 22, indicated in particular in FIG. 1, can be provided in the engagement region between the two locking mechanism parts 3, 4 for realizing, for example, a rolling friction. The respective bearing body 22 may be a cylindrical body, a ball or a comparable rotating body, which is usually held in a cage. According to the exemplary embodiment, the respective bearing body 22 can but does not have to be found on the pawl 4, namely in the region of its engagement or opposite to the main detent of the rotary latch 3, in order to provide a particularly friction-optimized release of the pawl 4 from the rotary latch 3 during the opening process of the locking mechanism 3, 4.

LIST OF REFERENCE SIGNS

1 Base, metallic lock case
2 Lock case openings
3 Locking mechanism (part), rotary latch
4 Locking mechanism (part), pawl
5 Locking bolt
6 Pawl spring
7 Axis
8 Opening drive
9 Axis
10 Bearing surface
11 Support body
12 Bearing trough
13 Bearing pin
14 Stops
15 Counter stop
16 Casing
17 Arc segment
18 Guide surface
18' Mating guide surface
19 Plastic housing/hood
20 Flank
21 Chamber
22 Bearing body
α Pivoting angle
S Resistance radius
F Shearing forces
R Bearing radius

The invention claimed is:

1. A door lock for a motor vehicle door, the door lock comprising:
a locking mechanism including a rotary latch and a pawl, wherein each of the rotary latch and the pawl is rotatably supported on a base about a respective axis; and
a fixed support body having a resistance radius from a center of gravity of the support body to a periphery of the support body associated with a modulus of resistance and a bearing trough formed in the periphery, wherein the pawl has a bearing surface with a bearing radius, wherein the pawl engages the bearing trough via the bearing surface, and wherein the resistance radius is larger than the bearing radius,
wherein at least one guide surface is provided,
wherein the at least one guide surface is provided on a casing of the pawl, and wherein the at least one guide surface is configured to engage at least one corresponding mating guide surface to ensure that the bearing surface remains in contact with the bearing trough.

2. The door lock according to claim 1, wherein the pawl has a bearing pin comprising the bearing surface.

3. The door lock according to claim 2, wherein the bearing surface is formed at a front side of the bearing pin.

4. The door lock according to claim 1, wherein the fixed support body comprises at least one stop that is arranged on a side of the open bearing trough.

5. The door lock according to claim 4, wherein the at least one stop interacts with at least one counter stop of the pawl.

6. The door lock according to claim 5, wherein the at least stop and the at least one counter stop limit a pivoting movement of the pawl with respect to the fixed support body to pivoting angles up to 90°.

7. The door lock according to claim 1, wherein at least one additional bearing body is provided in an engagement region between the rotary latch and the pawl in order to realize a rolling friction.

8. The door lock according to claim 1, wherein the base is formed as a metallic lock case.

9. The door lock according to claim 1, wherein the bearing surface is arc-shaped.

10. The door lock according to claim 1, wherein the pawl comprises a casing made of plastic.

11. The door lock according to claim 1, wherein the at least one guide surface is provided in or on a casing of the pawl and/or a plastic housing.

12. The door lock according to claim 1, wherein the at least one guide surface interacts with a mating guide surface, which is formed on the pawl and/or a casing and/or a plastic housing.

13. The door lock according to claim 6, wherein the pivoting angles are up to 60°.

14. The door lock according to claim 13, wherein the pivoting angles are up to 50°.

15. The door lock according to claim 1, wherein the at least one mating guide surface is formed on the fixed support body.

16. The door lock according to claim 1, wherein the at least one mating guide surface is formed on a plastic housing of the lock.

17. The door lock according to claim 10, wherein the casing includes an opening shaped to rotatably receive the fixed support body.

18. A door lock for a motor vehicle door, the door lock comprising:
   a locking mechanism including a rotary latch and a pawl, wherein each of the rotary latch and the pawl is rotatably supported on a base about a respective axis; and
   a fixed support body having a resistance radius from a center of gravity of the support body to a periphery of the support body associated with a modulus of resistance and a bearing trough formed in the periphery, wherein the pawl has a bearing surface with a bearing radius, wherein the pawl engages the bearing trough via the bearing surface, and wherein the resistance radius is larger than the bearing radius,
   wherein the pawl comprises a casing made of plastic, and
   wherein the casing includes an opening shaped to rotatably receive the fixed support body.

* * * * *